US007697835B2

(12) United States Patent
Sasaki

(10) Patent No.: US 7,697,835 B2
(45) Date of Patent: Apr. 13, 2010

(54) IMAGING APPARATUS

(75) Inventor: Yoshiyuki Sasaki, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 295 days.

(21) Appl. No.: 11/806,978

(22) Filed: Jun. 5, 2007

(65) Prior Publication Data

US 2008/0008466 A1   Jan. 10, 2008

(30) Foreign Application Priority Data

Jun. 6, 2006  (JP)  ............................. 2006-157850

(51) Int. Cl.
*G03B 15/03* (2006.01)
*G03B 7/099* (2006.01)
(52) U.S. Cl. .................. 396/157; 396/161; 396/162; 396/165; 396/171; 396/172; 348/371
(58) Field of Classification Search ............... 396/61, 396/65, 67, 69, 96, 157, 215, 161–162, 164–166, 396/171–172, 233; 348/370–371
See application file for complete search history.

(56) References Cited

U.S. PATENT DOCUMENTS

| RE35,877 E | * | 8/1998 | Takagi | 396/157 |
| 5,999,747 A | * | 12/1999 | Imura et al. | 396/55 |
| 6,614,995 B2 | * | 9/2003 | Tseng | 396/61 |
| 7,130,535 B2 | * | 10/2006 | Takeuchi | 396/61 |
| 2004/0170420 A1 | * | 9/2004 | Fukui | 396/157 |
| 2005/0213957 A1 | * | 9/2005 | Tokunaga | 396/61 |
| 2006/0193622 A1 | * | 8/2006 | Endo | 396/157 |
| 2007/0212053 A1 | * | 9/2007 | Koyama | 396/157 |
| 2007/0280660 A1 | * | 12/2007 | Yeh et al. | 396/61 |

FOREIGN PATENT DOCUMENTS

| JP | 2527734 | 6/1996 |
| JP | 2006-53493 | 2/2006 |
| JP | 2007-139819 | 6/2007 |

\* cited by examiner

*Primary Examiner*—W.B. Perkey
*Assistant Examiner*—Dennis Hancock
(74) *Attorney, Agent, or Firm*—Dickstein Shapiro LLP

(57) ABSTRACT

An imaging apparatus includes an emission device for illuminating a subject, a preliminary emission control device for controlling preliminary emission before photographing, a photometry device for measuring a reflected light volume from the subject in the preliminary emission so as to obtain a photometric result, and a main emission control device for controlling main emission when photographing, the main emission control device has a first emission control for conducting emission by adjusting emission volume by using the photometric result, and a second emission control for conducting emission until the reflected light volume from the subject reaches a predetermined volume, the main emission control device conducts an emission control by either the first emission control or the second emission control according to the photometric result.

8 Claims, 4 Drawing Sheets

IMAGING APPARATUS

PRIORITY CLAIM

This application claims priority from Japanese Patent Application No. 2006-157850, filed with the Japanese Patent Office on Jun. 6, 2006, the contents of which are incorporated herein by reference in their entirety.

BACKGROUND OF THE INVENTION

1. Field of the Invention

The present invention relates to an imaging apparatus such as a digital camera, particularly, to an imaging apparatus which conducts photographing by selecting the most suitable emission method from a plurality of emission methods based on a preliminary emission result.

2. Description of the Related Art

In an imaging apparatus such as a digital camera, photographing is conducted by using an illumination device such as a strobe light when a subject is dark. The following two methods are mainly used as an emission control method.

A first method is mainly adopted for a digital camera. The first method is a method of preliminary flashing a strobe light before photographing, measuring light volume from a subject by means of an imaging device, and setting the appropriate emission volume of the strobe light. In this emission control method, the preliminary emission is conducted before photographing, and the reflected light volume from the subject is measured by means of the imaging device, so as to calculate the appropriate main emission volume of the strobe light based on the brightness of the subject obtained by measuring the reflected light volume. In this case, using the property such that emission volume attenuates in inverse proportion to the squared distance to the subject, it is general to calculate the emission volume to the subject by measuring the distance to the subject with a measurement device, so as to use the calculated emission volume as the reference emission volume in the preliminary emission and the main emission. More particularly, in the preliminary emission, the emission is performed by the reference emission volume calculated according to the subject distance, and in the main emission, the emission volume is slightly adjusted such that the photometric result is reflected in the reference emission volume.

However, in the above emission control method, a measurement error in the subject directly appears as an error of the reference emission volume. In terms of focusing, it is not practically a problem to lower the measurement accuracy by the deepened depth of field for a long-distance subject. However, in terms of exposure control, it is unacceptable to lower the measurement accuracy because of the above reason (the property such that the emission volume attenuates in inverse proportion to the squared distance to the subject). If the measurement error is within a certain range, the emission volume of the main emission can be corrected by the photometric result in the preliminary emission. However, if the measurement error is increased, the emission volume of the main emission can not be corrected by the photometric result.

A second method is mainly adopted for a silver salt camera which conducts photographing by using a photographic film. This second method is a method of measuring reflected light from a subject by using a photometry device provided in the front face of the camera, and continuing emission till a predetermined light volume is obtained. In this method, a strobe light is measured during photographing, so the preliminary photometry is not necessary and also the time required for the photometry is omitted. However, accurate photometry may not be performed because of parallax, especially when the subject is a close-range subject As described above, each of the first and second emission control methods has advantages and disadvantages. Accordingly, there is an apparatus which performs an emission control by switching the above two control methods according to a distance to a subject (refer to JP2527734B). This apparatus carries out an emission control which changes an aperture stop and shutter speed based on a distance to a subject, when the apparatus determines that the distance to the subject is shorter than a limit distance defined based on measurement accuracy. On the other hand, this apparatus carries out an emission control by means of modulated light based on the light volume of the reflected light from the subject, when the apparatus determines that the distance to the subject is longer than the limit distance.

Moreover, a stroboscopic photographing apparatus which determines the emission volume for photographing by a photometric result is disclosed in JP2006-53493A. In this apparatus, an amplification control device is controlled according to an output of a measurement device when measuring the preliminary emission, so as to vary amplification (receiving sensitivity) of imaging signals.

However, in the emission control method disclosed in JP2517734B, it is a premise that the measurement of the subject distance be accurately conducted. For example, when the measurement is not accurately conducted due to low brightness, the most suitable emission control can not be performed. In addition, when the measurement of the subject distance is performed by using a focusing control method such as CCDAF (Charge-Coupled Device Auto Focus), an approximate subject distance is calculated from a focused position of a focusing lens. Therefore, measurement accuracy more than a driving step of the focusing lens can not be obtained, and also sufficient measurement accuracy can not be obtained especially for a long-distance subject. In this case, the limit distance capable of obtaining sufficient accuracy in the CCDAF measurement can not be always used as a switching distance when switching the above two methods. For example, if the above emission control by the second method is conducted in the vicinity of the limit distance of the CCDAF measurement, accurate photometry is not conducted because of parallax.

Accordingly, there is a need for an imaging apparatus capable of conducting the most suitable emission control when a correct measurement result is not obtained.

SUMMARY OF THE INVENTION

One aspect of the present invention involves an imaging apparatus including an emission device for illuminating a subject, a preliminary emission control device for controlling preliminary emission before photographing, a photometry device for measuring a reflected light volume from the subject in the preliminary emission so as to obtain a photometric result, and a main emission control device for controlling main emission when photographing. The main emission control device includes a first emission control for conducting emission by adjusting emission volume by using the photometric result, and a second emission control for conducting emission until the reflected light volume from the subject reaches a predetermined volume. The main emission control device conducts an emission control by either the first emission control or the second emission control according to the photometric result.

Preferably, the main emission control device conducts the emission control by the first emission control when the reflected light volume measured by the photometry device is a predetermined first threshold and above.

Advantageously, the main emission control device selects the second emission control when the reflected light volume measured by the photometry device is smaller than a predetermined first threshold.

In a preferred embodiment, the preliminary emission control device conducts the emission by emission volume according to a first distance of a predetermined fixed distance.

Advantageously, the main emission control device includes a third emission control for conducting emission by emission volume according to a second distance of a predetermined fixed distance, and selects the third emission control when the reflected light volume measured by the photometry device is larger than a second threshold.

Preferably, the second distance is shorter than the first distance.

In a preferred embodiment, the imaging apparatus further includes a measurement device for measuring a distance to the subject. The preliminary emission control device conducts the emission according to the first distance when the measurement by the measurement device is disabled.

Advantageously, the imaging apparatus further includes a measurement device for measuring a distance to the subject. The preliminary emission control device conducts the emission according to the first distance when the distance to the subject measured by the measurement device is larger than a predetermined threshold.

BRIEF DESCRIPTION OF THE DRAWINGS

These and other features, aspects, and advantages of the present invention will become better understood with regard to the following description, appended claims, and accompanying drawings.

DETAILED DESCRIPTION OF THE INVENTION

Hereinafter, an embodiment of the present invention will be described with reference to the accompanying drawings. In the present embodiment, an emission device corresponds to a stroboscopic device 12 shown in FIG. 1, particularly, to an emission unit 43 shown in FIG. 4, a preliminary emission control device and a main emission control device correspond to a CPU 14 shown in FIG. 1, a photometry device corresponds to a photometry unit 44 shown in FIG. 4, and a measurement device corresponds to a measurement unit 5 shown in FIG. 1.

Figure 1:
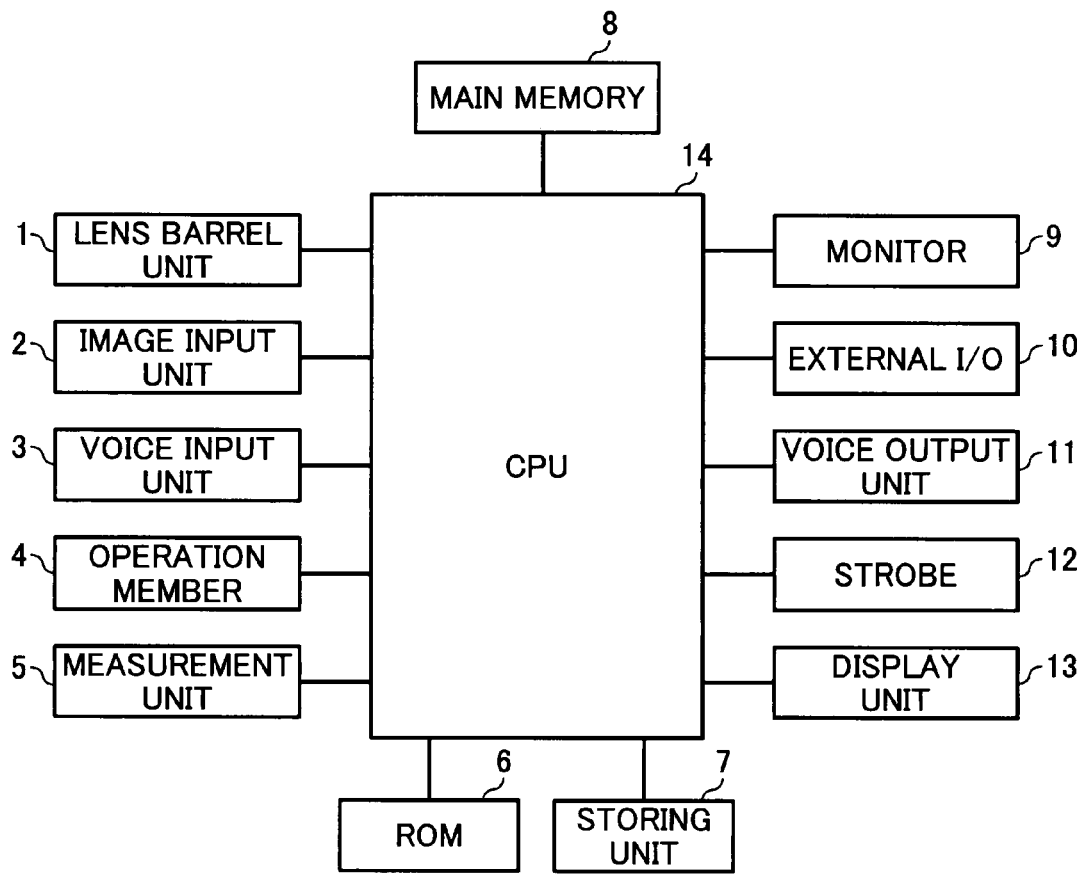
FIG. 1 is a block diagram showing functions of an imaging apparatus according to an embodiment of the present invention.

FIG. 1 is a block diagram showing functions of an imaging apparatus according to the present embodiment. Reference number 1 denotes a lens barrel unit, reference number 2 denotes an image input unit, reference number 3 denotes a voice input unit, reference number 4 denotes an operation member, reference number 5 denotes a measurement unit (measurement device), reference number 6 denotes a ROM, reference number 7 denotes a storing unit, reference number 8 denotes a main memory, reference number 9 denotes a monitor, reference number 10 denotes an external I/O, reference number 11 denotes a voice output unit, reference number 12 denotes a stroboscopic device (emission device), reference number 13 denotes a display unit, and reference number 14 denotes a CPU (preliminary emission device and main emission device).

Figure 2:
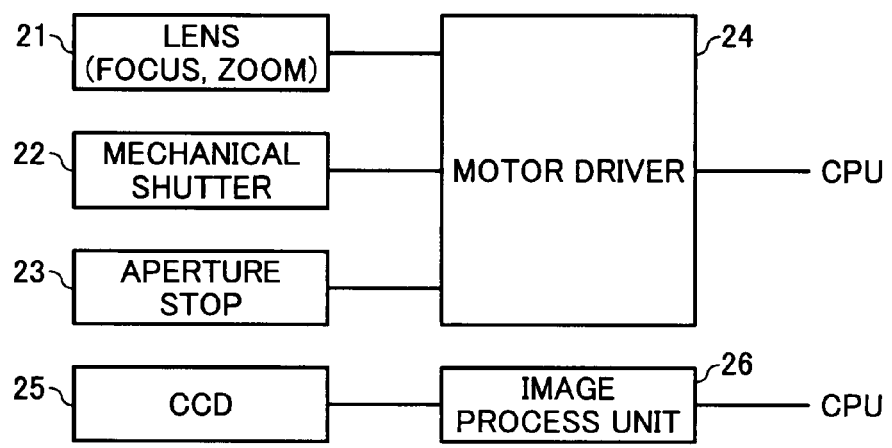
FIG. 2 is a block diagram illustrating details of a lens barrel of the imaging apparatus shown in FIG. 1.

FIG. 2 illustrates the details of the lens barrel unit 1 and the image input unit 2 shown in FIG. 1. The lens barrel unit 1 includes a lens 21 (zooming, focusing) for capturing an optical image of a subject into a CCD, a mechanical shutter 22, an aperture stop 23, and a motor driver 24. The motor driver 24 includes functions which drive motors (not shown) for driving the lens 21, the mechanical shutter 22 and the aperture stop 23.

The image input unit 2 includes a CCD 25, and an image processing unit 26 (amplification control device) for processing the captured optical image. The CCD 25 is a solid state image sensor for photoelectrically converting an optical image. The image processing unit 26 includes a correlated double sampling circuit for eliminating image noise, an amplifying circuit, a white balance adjusting circuit and a digital signal converting circuit. The image processing unit 26 has a function for increasing and decreasing the entire brightness by changing the amplification. The motor driver 24 and the image processing unit 26 are processed or driven by a driving command from the CPU 14.

Referring to FIG. 1, the voice input unit 3 includes a microphone to which a user inputs a voice signal, a microphone AMP for amplifying the input voice signal, and a voice recording circuit for recording the amplified voice signal. The operation member 4 is a key circuit which is operated by a user. The measurement unit 5 measures a distance to a subject.

The ROM 6 stores parameters described by the CPU 14 with readable codes for controlling control programs. If the power source of the imaging apparatus is an the ON state, the programs stored in the ROM 6 are loaded into the main memory 8, and the CPU 14 controls the operation of each unit of the apparatus in accordance with the program, and also temporarily stores data required for the control into the main memory 8. If a rewritable flash ROM is used as the ROM 6, the control programs or the parameters for controlling can be changed; thus, the functions can be easily upgraded.

The storing unit 7 is a memory capable of storing photographed image data when a memory card is not inserted into a memory card throttle. The main memory 8 is used for temporarily storing the data required for the control by the CPU 14. In addition, the main memory 8 is used for temporarily storing image data when the various processes are performed to the image data by the CPU 14. The image data to be stored in the main memory 8 includes, for example, "RAW-RGB image data" to which white balance setting and gamma-setting are conducted, "YUV image data" to which luminance data and color-difference data conversion is conducted and "JPEG image data" to which JPEG compression is performed. These image data are loaded from the CCD 25 via the image processing unit 26.

The monitor 9 is used for confirming a subject state before photographing and a photographed image and also for displaying image data recorded in an internal memory such as a memory card and the storing unit 7. The external portion I/O 10 is a circuit for converting voltage of an output signal of a serial block, so as to perform serial communication with an external device such as a personal computer. The voice output unit 11 includes a voice reproduction circuit for converting recorded voice signals into signals capable of being output from a speaker, an audio AMP for amplifying the converted voice signals, so as to drive a speaker, and a speaker for outputting the voice signals.

The stroboscopic device 12 emits a flashlight to a subject. The display unit 13 shows a state of the imaging apparatus by means of diode. The display unit 13 is, for example, an on switch.

The CPU 14 includes a control block for conducting the white balance setting and gamma-setting to the output data from the CCD 25 via the image processing unit 26 and also conducting the conversion to the luminance data and the color difference data by a filtering process, a block for controlling the operation of each unit of the apparatus, a USB block for conducting USB communication with an external device such as a personal computer, a serial block for performing serial communication with the external device such as a personal computer, a block for conducting JPEG compression and expansion, a block for enlarging and reducing a size of an image data by an interpolating process, a TV signal display block for converting the image data into video signals, so as to display the image data onto an external display device such as a liquid crystal monitor and TV, and a memory card block for controlling a memory card storing photographed image data.

Figure 3:
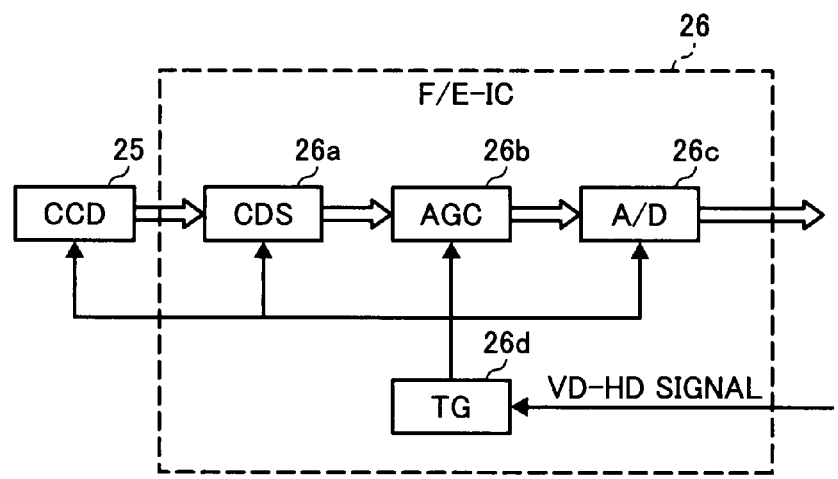
FIG. 3 is a block diagram illustrating details of a CCD 25 as an image input unit 2 and an image processing unit 26.

FIG. 3 is a block diagram illustrating details of the CCD 25 and the image processing unit 26 as the image input unit 2. The image processing unit 26 includes a front and end process unit IC (F/E-IC). The image processing unit 26 sets amplification of image signals.

The CCD 25 is a solid-state image sensing device for photoelectrically converting an optical image. The image processing unit 26 includes a CDS 26a for performing image noise elimination correlated with double sampling of analogue photographed data input from the CCD 25, an AGC 26b for detecting amplitude variation of the photographed data and for automatically adjusting gain of an amplifier, so as to constantly maintain output signals, an A/D 26c for converting the analogue signals into digital signals, and a TG 26d for generating driving trimming signals of the CCD 25 and the image processing unit 26 based on a vertical synchronized signal VD and a horizontal synchronized signal HD.

Figure 4:
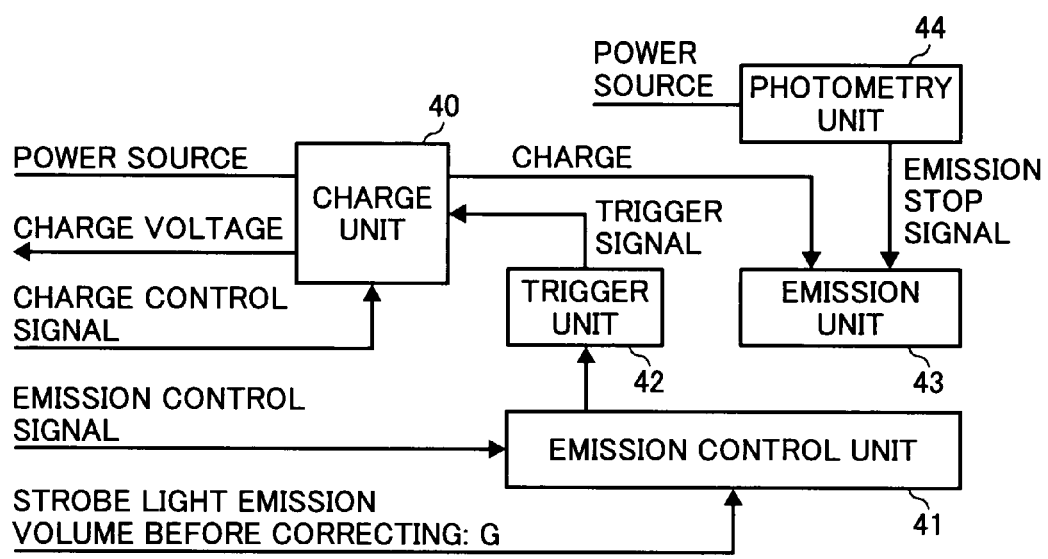
FIG. 4 is a block diagram showing a stroboscopic circuit of the imaging apparatus in FIG. 1.

FIG. 4 is a block diagram showing a circuit of the stroboscopic device 12. Reference number 40 denotes a charge unit, reference number 41 denotes an emission control unit, reference number 42 denotes a trigger unit, reference number 43 denotes an emission unit (emission device), and reference number 44 denotes a photometry unit.

The charge unit 40 includes a feedback circuit of pressure rising, charge accumulation and voltage accumulation. The charge unit 40 raises power source voltage, accumulates charge in a capacitor, returns the accumulated voltage to the CPU 14, and controls the charge voltage by a charge control signal of the CPU 14.

The emission control unit 41 outputs a signal to the trigger unit 42 according to change in an emission control signal from Low to High supplied from the CPU 14. The trigger unit 42 supplies a trigger signal to the charge unit 40. Thereby, the charge of the capacitor in the charge unit 40 is discharged to the emission unit 43, and the emission in the emission unit 43 is started. The emission stops according to the change in the emission control signal from High to Low supplied from the CPU 14. The emission volume is controlled by a duration in which the emission control signal is High. In addition, the emission control unit 41 generally includes an IGBT (Insulated Gate Bipolar Transistor) and a thyristor as a device for controlling emission. Moreover, the emission volume required for photographing, i.e., the duration in which the emission control signal is High is obtained according to a distance to a subject, an aperture stop, and an image amplification, and is previously stored in a memory such as the ROM 6 as a table. A drawing illustrating the control of the charge voltage is omitted; however, the charge voltage is monitored by the CPU 14 after dividing the charging voltage of the capacitor in the charge unit 40, and conducting A/D conversion to the divided voltage.

In the present embodiment, strobe light emission volume G before correcting is read into the emission control unit 41, and the emission control unit 41 is controlled by the emission control signal output from the CPU 14, thereby, a preliminary emission volume is varied.

The photometry unit 44 is a photometry circuit for measuring reflected light volume from a subject. If an emission control by means of a second method according to the present invention is conducted, the power source to the photometry unit 44 is turned on, the reflected light volume from the subject is converted into a current value, so as to accumulate the current value to an integration circuit (not shown) in the photometry unit 44. A photochromatic threshold, which stops the emission when a predetermined reflected light volume is obtained, is previously set to the photometry unit 44. Moreover, in a main emission control method, the CPU 14 supplies a sufficient emission time relative to the emission control unit 41, and an actual emission stop process is conducted by an emission stop signal sent from the photometry unit 44 to the emission unit 43.

Next, a first emission control method according to the present invention will be described. Here, preliminary emission is conducted by means of the above stroboscopic device 12. In this occasion, a difference (a difference ΔEV from appropriate photometric quantity of the photometric value of the preliminary emission) relative to the reference photometric quantity (reflected light volume having 18% standard reflectance) is determined from the photometric result received from the CCD 25. Then, a previously set coefficient K is added to the difference relative to the standard photometric quantity, so as to conduct correction as the strobe light emission volume when photographing. An appropriate stroboscopic emission volume relative to a difference of a reflectance of a subject can be obtained by conducting stroboscopic photographing.

At first, the strobe light emission volume before correcting G is obtained according to a subject distance L, an aperture stop F, and a photographing amplification A. On the other hand, the photographing light volume after correcting Gx is obtained by the following equation (1), where a correction value by a difference relative to the reference photometric quantity ΔEV obtained by the above preliminary emission and a coefficient K is ΔEV*K, $$Gx = G * \mathrm{sqr}(2)^{\wedge}(\Delta EV * K) \quad (1)$$

In addition, the coefficient K is a coefficient which changes by the value of ΔEV, and the correction amount can be changed corresponding to a reflectance by previously storing the coefficients K in a memory such as the ROM 6 as a table.

Figure 5A:
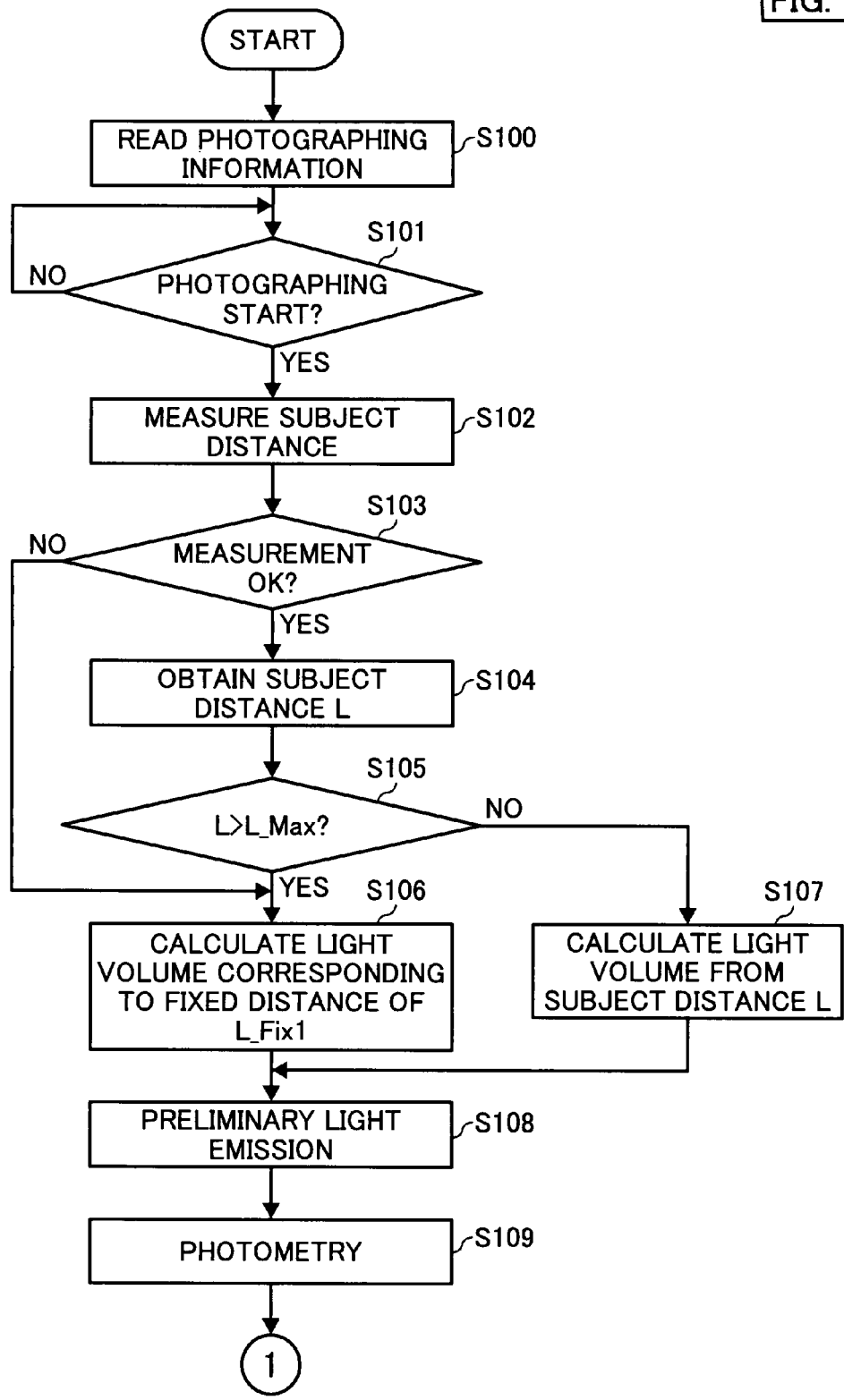
FIG. 5 illustrates a flow of light volume correction by using a preliminary emission in the imaging apparatus in FIG. 1.
Figure 5B:
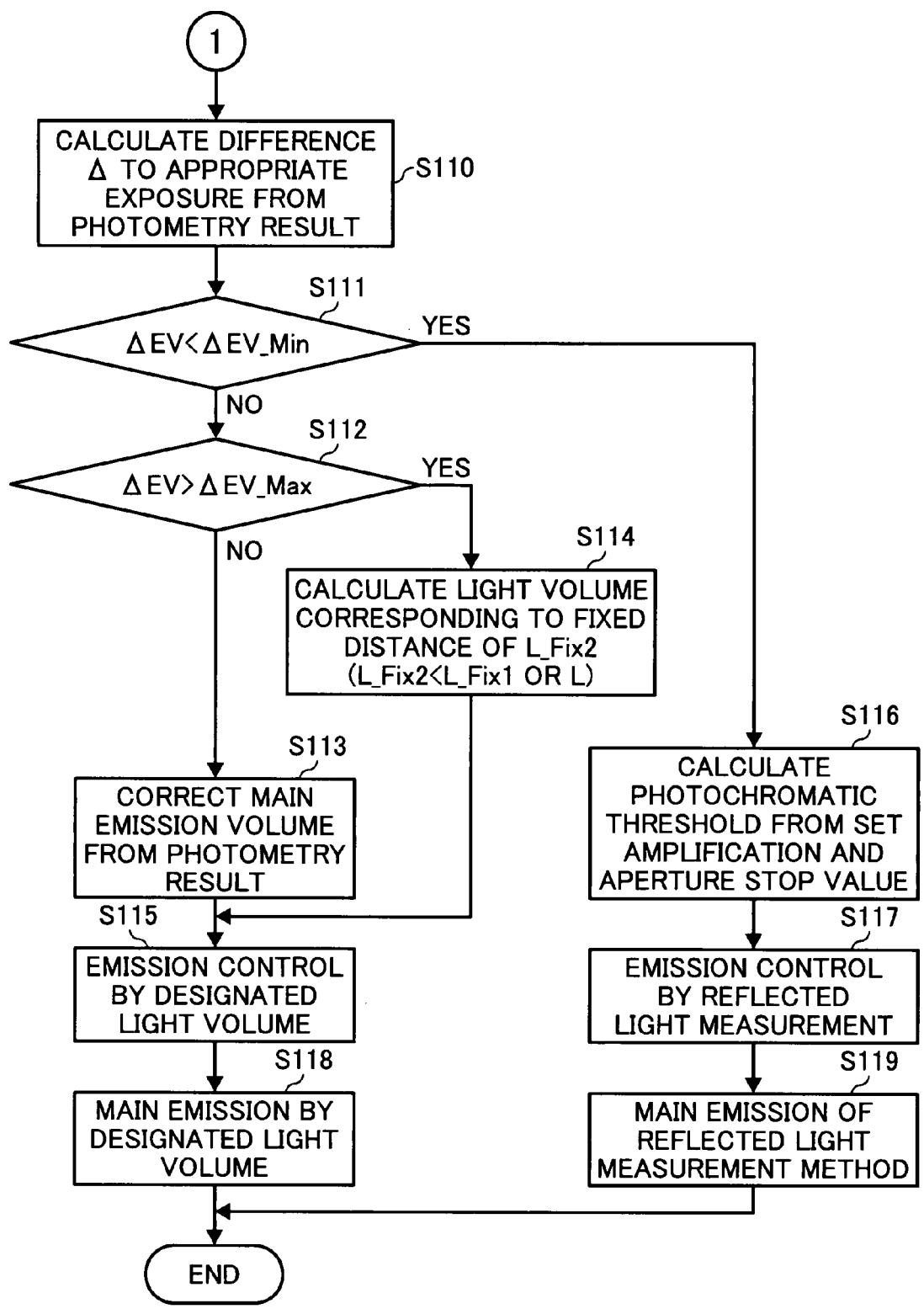

FIG. 5 shows a flow chart for correcting light volume by means of the preliminary emission in the imaging apparatus according to the present embodiment. At first, if the stroboscopic photographing is started, the CPU 14 reads photographing information such as photographing amplification, aperture stop, brightness, and automatic white balance (AWB) (step S100), and waits for the start of the photographing (step S101).

If the photographing is started (in the case of Yes at step S101), the CPU 14 measures a distance to a subject by the measurement unit 5 (step S102), and determines whether the distance is normally measured (step S103). If the distance is normally measured (in the case of Yes at step S103), the CPU 14 obtains the distance L to the subject (step S104).

The imaging apparatus according to the present invention determines the preliminary emission volume according to the subject distance L. In this case, the CPU 14 determines whether the subject distance L is larger than a previously set distance L_Max (step S105).

If the subject distance L is larger than the L_Max (in the case of Yes at step S105), namely, the subject is a long-distance subject, the CPU 14 determines that the subject distance is not measured with high accuracy, and calculates the preliminary emission volume based on a fixed distance L_Fix 1 (a first distance) (step S106). For example, if the subject distance is measured by using a focusing control method such as a CCDAF, an approximate subject distance is calculated from a focused position of a focusing lens. Therefore, measuring accuracy more than the driving step of the focusing lens can not be obtained, and sufficient measuring accuracy can not be obtained especially for the long-distance subject. Accordingly, in the present embodiment, if the subject distance L as a measurement result is larger than the limit distance (L_Max) which can obtain sufficient measurement accuracy by the CCDAF, i.e., if the subject distance L is a long-distance subject, the preliminary emission volume is calculated by using the predetermined fixed distance L_Fix1.

On the other hand, at step S105, if the subject distance L is smaller than L_Max (in the case of No at step S105), namely, the subject is a close-range subject, the CPU 14 determines that the subject distance is measured with sufficient accuracy, and calculates the preliminary emission volume based on the subject distance L (step S107).

In addition, at step S103, if the subject distance is not normally measured (in the case of No at step S103), the CPU 14 skips the steps S104, S105, and calculates the preliminary emission volume based on the fixed distance L_Fix 1. For instance, if the subject is especially in a dark place, the subject distance L is not obtained because the distance can not be measured by means of the measurement unit 5. In this case, the preliminary emission is performed by the emission volume corresponding to the previously set fixed distance L_Fix 1.

Then, the CPU 14 conducts the preliminarily emission by the calculated emission volume (step S108). In addition, since the function of the photometry unit 44 is not used in the preliminary emission control at step S108, the power source to be supplied to the photometry unit 44 is turned off.

Next, the CPU 14 measures the reflected light volume from the subject in the preliminary emission (step S109). In this case, the CPU 14 converts the analogue image signals received via the CCD 25 into the digital signals by means of the A/D 26c, and extracts the subject brightness Y, and then calculates a difference $\Delta EV$ to appropriate exposure (step S110). More particularly, using the appropriate exposure as a standard, if the subject brightness Y is brighter than the appropriate brightness, the $\Delta EV$ is a positive value, and also if the subject brightness Y is darker than the appropriate brightness, the $\Delta EV$ is a negative value.

Next, the CPU 14 determines whether the difference $\Delta EV$ to the appropriate exposure is in a correctable range. In this case, at first, the CPU 14 determines whether the difference $\Delta EV$ to the appropriate exposure is smaller than a predetermined threshold $\Delta EV\_Min$ (a first threshold) (step S111). If the difference $\Delta EV$ to the appropriate exposure is $\Delta EV\_Min$ and above (in the case of No at step S111), the CPU 14 determines whether the difference $\Delta EV$ to the appropriate exposure is larger than a predetermined threshold $\Delta EV\_Max$ (a second threshold) (step S112). If the difference $\Delta EV$ to the appropriate exposure is $\Delta EV\_Max$ and below (in the case of No at step 112), the CPU 14 determines that the difference $\Delta EV$ to the appropriate exposure is in the correctable range, and corrects the main emission volume based on the difference $\Delta EV$ to the appropriate exposure (step S113).

On the other hand, if the difference $\Delta EV$ to the appropriate exposure is larger than the $\Delta EV\_Max$ at step S112 (in the case of Yes at step S112), the CPU 14 calculates the emission volume based on a predetermined fixed distance L_Fix 2 (a second distance), and adopts the calculated emission volume as the main emission volume (step S114). In this case, L_Fix 2 uses a value smaller than the fixed distance L_Fix 1 or the measurement result L according to the determination that the subject distance is a distance shorter than a distance (fixed distance L_Fix 1 or the subject distance L) used for the calculation of the emission volume of the preliminary emission.

Then, the CPU 14 sets an emission control mode, so as to perform the main emission by the emission volume calculated at step S113 or step S114 (step S115), and conducts the main emission (stroboscopic photographing) operation by the designated light volume (step S118). In addition, since the function of the photometry unit 44 is not used in the main emission control at step S118, the power source to be supplied to the photometry unit 44 is turned off.

On the other hand, at step S111, if the difference $\Delta EV$ to the appropriate exposure is smaller than the $\Delta EV\_Min$ (in the case of Yes at step S111), the CPU 14 calculates a photochromatic threshold for obtaining an appropriate reflected light volume according to the set photographing amplification, aperture stop or the like (step S116), and sets the emission control mode, so as to conduct the main emission by means of a reflected light measurement method (step S117), and then conducts the main emission (stroboscopic photographing) operation by means of the reflected light measurement method (step S119).

More particularly, the emission control at step S119 is a method of measuring the reflected light from the subject by the photometry unit 44, and of continuing the emission until a predetermined light volume is obtained. At step S117, the power source to be supplied to the photometry unit 44 is turned on, and the photocromatic threshold is set.

According to the present embodiment, when the reflected light volume measured by the photometry device is the predetermined threshold and above, the subject is predicted as a close-range subject. Therefore the emission control suitable for the close-range subject can be conducted by performing the emission control which previously calculates the emission volume based on the subject distance.

Moreover, according to the present embodiment, when the reflected light volume measured by the photometry device is smaller than the predetermined threshold, the subject is predicted as a long-distance subject. Therefore, the emission control suitable for the long-distance subject can be conducted by performing the emission control which measures the reflected light from the subject and continues the emission until a predetermined light volume is obtained.

Furthermore, according to the present embodiment, if the measurement to the subject fails, the preliminary emission is conducted by the emission volume based on the predetermined fixed distance (the first distance). Thus, the emission control can be conducted although the subject distance is unknown due to low brightness.

In addition, according to the present embodiment, when the reflected light volume measured by the photometry device is larger than the correctable range, the subject distance is predicted as a distance shorter than the distance used for the calculation of the emission volume of the preliminary emission. Accordingly, the emission control can be conducted to the nearest subject by performing the emission corresponding to the predetermined fixed distance (the second distance but shorter than the first distance).

Moreover, according to the present embodiment, the preliminary emission is performed by the emission volume according to the first distance of the predetermined fixed distance when the subject distance is unknown. Therefore, the present invention can be adoptable for a photographing environment under lower brightness.

According to the present embodiment, when the subject distance is larger than the predetermined threshold, the preliminary emission is conducted by the emission volume according to the first distance of the predetermined fixed distance. Therefore, the emission control can be performed when the photometry device (for example, CCDAF) whose measurement performance is not sufficient for a long-distance subject is used.

The present invention is described for the stroboscopic imaging apparatus, but the present invention can be adopted for another imaging apparatus which performs photometry by preliminary emission and has a plurality of emission control methods.

Although the present invention has been described in terms of exemplary embodiments, it is not limited thereto. It should be appreciated that variations may be made in the embodiments described by persons skilled in the art without departing from the scope of the present invention as defined by the following claims. In addition, the number, position, shape, or the like of the components are not limited to the above embodiments, and can be changed to a number, position, shape or the like of components preferable for conducting the present invention. Moreover, no element or component in the present disclosure is intended to be dedicated to the public regardless of whether the element or component is explicitly recited in the following claims.

What is claimed is:

1. An imaging apparatus, comprising:
   an emission device for illuminating a subject;
   a preliminary emission control device for controlling preliminary emission before photographing;
   a photometry device for measuring a reflected light volume from the subject in the preliminary emission so as to obtain a photometric result; and
   a main emission control device for controlling main emission when photographing,
   the main emission control device including:
      a first emission control which adjusts emission volume by using the photometric result, and conducts emission with the adjusted emission volume; and
      a second emission control which measures reflected light from the subject while conducting emission, and continues emission until the measured reflected light volume from the subject reaches a predetermined volume,
   wherein the main emission control device conducts an emission control by either the first emission control or the second emission control according to the photometric result.

2. The imaging apparatus according to claim 1, wherein the main emission control device conducts the emission control by the first emission control when the reflected light volume measured by the photometry device is a predetermined first threshold and above.

3. The imaging apparatus according to claim 1, wherein the main emission control device selects the second emission control when the reflected light volume measured by the photometry device is smaller than a predetermined first threshold.

4. The imaging apparatus according to claim 1, wherein the preliminary emission control device conducts the emission by emission volume according to a first distance of a predetermined fixed distance.

5. The imaging apparatus according to claim 4, wherein the main emission control device includes a third emission control for conducting emission by emission volume according to a second distance of a predetermined fixed distance, and selects the third emission control when the reflected light volume measured by the photometry device is larger than a second threshold, and
   the second distance is shorter than the first distance.

6. The imaging apparatus according to claim 4, further comprising a measurement device for measuring a distance to the subject, wherein the preliminary emission control device conducts the emission according to the first distance when the measurement by the measurement device is disabled.

7. The imaging apparatus according to claim 4, further comprising a measurement device for measuring a distance to the subject, wherein the preliminary emission control device conducts the emission according to the first distance when the distance to the subject measured by the measurement device is larger than a predetermined threshold.

8. The imaging apparatus according to claim 1, wherein the main emission control device includes a third emission control for conducting emission by emission volume according to a second distance of a predetermined fixed distance, and selects the third emission control when the reflected light volume measured by the photometry device is larger than a second threshold.

* * * * *